(12) United States Patent
Gordon et al.

(10) Patent No.: US 11,175,679 B2
(45) Date of Patent: Nov. 16, 2021

(54) DRONE ELASTIC MAP

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 235 days.

(21) Appl. No.: 16/515,220

(22) Filed: Jul. 18, 2019

(65) Prior Publication Data

US 2021/0016879 A1 Jan. 21, 2021

(51) Int. Cl.
*G05D 1/10* (2006.01)
(52) U.S. Cl.
CPC ........ *G05D 1/104* (2013.01); *B64C 2201/123* (2013.01)
(58) Field of Classification Search
CPC ............................ G05D 1/104; B64C 2201/123
See application file for complete search history.

(56) References Cited

U.S. PATENT DOCUMENTS

| | | | |
|---|---|---|---|
| 7,554,440 | B2 | 6/2009 | Kadaba et al. |
| 8,797,550 | B2 | 8/2014 | Hays et al. |
| 9,684,673 | B2 | 6/2017 | Beckett et al. |

(Continued)

FOREIGN PATENT DOCUMENTS

| | | |
|---|---|---|
| CN | 204807135 U | 11/2015 |
| CN | 204807505 U | 11/2015 |

(Continued)

OTHER PUBLICATIONS

Elistair, [online]; [retrieved on Jun. 13, 2019]; retrieved from the Internet https://elistair.com/private-public-safety-2/. "Tethered Drones for Air Quality", 3 pages.

(Continued)

*Primary Examiner* — Rami Khatib
*Assistant Examiner* — Shahira Baajour
(74) *Attorney, Agent, or Firm* — Cantor Colburn LLP; Stosch Sabo (57) ABSTRACT

Methods, systems, and computer program products are provided. Aspects include determining characteristic data associated with a physical environment, based on the characteristic, determining an elastic map for the physical environment, wherein the elastic map comprises a graph comprising a set of nodes and a set of edges, wherein each edge connects two nodes and a set of configurable parameters that define an elastic coupling for each edge, determining an initial physical configuration of the set of nodes in the physical environment based on the elastic map, causing a set of mobile sensors to establish the initial configuration in the physical environment, simulating a mobile sensor elastic coupling between each mobile sensor based on the elastic energy function for each edge, collecting an environmental data point associated with the physical environment, and adjusting a configuration of the set of mobile sensors based on the environmental data point.

20 Claims, 5 Drawing Sheets

(56) References Cited

U.S. PATENT DOCUMENTS

| | | | |
|---|---|---|---|
| 9,952,190 | B2 | 4/2018 | Cogill et al. |
| 9,959,374 | B2 | 5/2018 | Rosti et al. |
| 10,263,841 | B1* | 4/2019 | Stamatakis ............ H04L 41/145 |
| 10,317,216 | B1* | 6/2019 | Sipko ....................... H04W 4/80 |
| 2016/0364989 | A1 | 12/2016 | Speasl et al. |
| 2018/0035605 | A1 | 2/2018 | Guan et al. |
| 2019/0147753 | A1* | 5/2019 | Hendrian ............... G05D 1/104 701/14 |
| 2020/0378940 | A1* | 12/2020 | Pariseau ............. G01N 15/1459 |

FOREIGN PATENT DOCUMENTS

| | | |
|---|---|---|
| CN | 204808043 U | 11/2015 |
| WO | 1996041097 A1 | 12/1996 |

OTHER PUBLICATIONS

Experiment, [online]; [retreived online on Jun. 13, 2019]; retrieved from the Internet https://experiment.com/projects/measurement-of-atmospheric-pollution-profiles-using-drones. Edwards et al., "Measurement of Atmospheric Pollution Profiles Using Drones", 9 pages.
Hackaday.IO, [online]; [retrieved on Jun. 13, 2019]; retrieved from the Internet, https://hackaday.io/project/6683-surveillance-and-air-quality-monitoring-drone. D. Singh, "Surveillance and Air QUality Monitoring Drone", 2015, 6 pages.
Next City, [online]; [retrieved online on Jun. 13, 2019]; retrieved from Internet https://nextcity.org/daily/entry/tools-measure-air-pollution-airbeam-aircaster-epa. R. Tuhus-Dubrow, "EPA Scientist: Tools That Let Everyone Measure Air Pollution Are a Game-Changer", The Science of Cities, Aug. 12, 2014, 4 pages.
O. Alvear, "Using UAV-Based Systems to Monitor Air Pollution in Areas with Poor Accessibility", Journal of Advanced Transportation, Hindawi, vol. 2017, 14 pages.
R. Baxter et al., "Use of Small Unmanned Aerial Vehicles for Air Quality and Meteorological Measurements", T&B Systems, Inc., National Ambient Air Monitoring Conference, 2014, 19 pages.
Scentroid, [online]; [retrieved on Jun. 13, 2019]; retrieved from the Internet http://scentroid.com/scentroid-sampling-drone/. "Sampling Drone DR300", Ides Canada, 2015, 17 pages.

\* cited by examiner

DRONE ELASTIC MAP

BACKGROUND

The present invention generally relates to computer technology, and more specifically, to the generation and use of an elastic map utilizing computer-controlled drone technology.

Basic properties of electronic information include the multidimensionality of data objects. Typical data objects include hundreds and thousands of features that can be difficult to visualize in a 2 or 3 dimensional space (e.g., graphs and diagrams). Computing systems can utilize elastic maps to generate a visual representation of data objects using a two-dimensional (or three-dimensional) picture of the information and laying on it additional relevant information.

Computing systems use elastic maps to represent data and clusters in a measurement space by embedding measurements in a curved manifold. The elastic connection between the nodes is utilized for creating an energy function that is minimized by simulating a physical system as the elastic connection attempts to maintain a tight relationship to representing the data space.

SUMMARY

Embodiments of the present invention are directed to a computer-implemented method for operating mobile sensors. A non-limiting example of the computer-implemented method includes determining, by a processing device, characteristic data associated with a physical environment, based at least in part on the characteristic data associated with the physical environment, determining an elastic map for the physical environment, wherein the elastic map comprises a graph comprising a set of nodes and a set of edges, wherein each edge in the set of edges connects two nodes in the set of nodes and a set of configurable parameters that define an elastic coupling for each edge in the set of edges, determining an initial physical configuration of the set of nodes in the physical environment based on the elastic map, causing a set of mobile sensors to establish the initial physical configuration in the physical environment, simulating a mobile sensor elastic coupling between each mobile sensor in the set of mobile sensors based on the elastic energy function for each edge in the set of edges, collecting, from a first mobile sensor at a first location, an environmental data point associated with the physical environment, and adjusting a configuration of the set of mobile sensors based on the environmental data point.

Embodiments of the present invention are directed to a system for operating mobile sensors. A non-limiting example of the system includes a processor configured to perform determining, by a processing device, characteristic data associated with a physical environment, based at least in part on the characteristic data associated with the physical environment, determining an elastic map for the physical environment, wherein the elastic map comprises a graph comprising a set of nodes and a set of edges, wherein each edge in the set of edges connects two nodes in the set of nodes and a set of configurable parameters that define an elastic coupling for each edge in the set of edges, determining an initial physical configuration of the set of nodes in the physical environment based on the elastic map, causing a set of mobile sensors to establish the initial physical configuration in the physical environment, simulating a mobile sensor elastic coupling between each mobile sensor in the set of mobile sensors based on the elastic energy function for each edge in the set of edges, collecting, from a first mobile sensor at a first location, an environmental data point associated with the physical environment, and adjusting a configuration of the set of mobile sensors based on the environmental data point.

Embodiments of the invention are directed to a computer program product for operating mobile sensors, the computer program product comprising a computer readable storage medium having program instructions embodied therewith. The program instructions are executable by a processor to cause the processor to perform a method. A non-limiting example of the method includes determining, by a processing device, characteristic data associated with a physical environment, based at least in part on the characteristic data associated with the physical environment, determining an elastic map for the physical environment, wherein the elastic map comprises a graph comprising a set of nodes and a set of edges, wherein each edge in the set of edges connects two nodes in the set of nodes and a set of configurable parameters that define an elastic coupling for each edge in the set of edges, determining an initial physical configuration of the set of nodes in the physical environment based on the elastic map, causing a set of mobile sensors to establish the initial physical configuration in the physical environment, simulating a mobile sensor elastic coupling between each mobile sensor in the set of mobile sensors based on the elastic energy function for each edge in the set of edges, collecting, from a first mobile sensor at a first location, an environmental data point associated with the physical environment, and adjusting a configuration of the set of mobile sensors based on the environmental data point.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
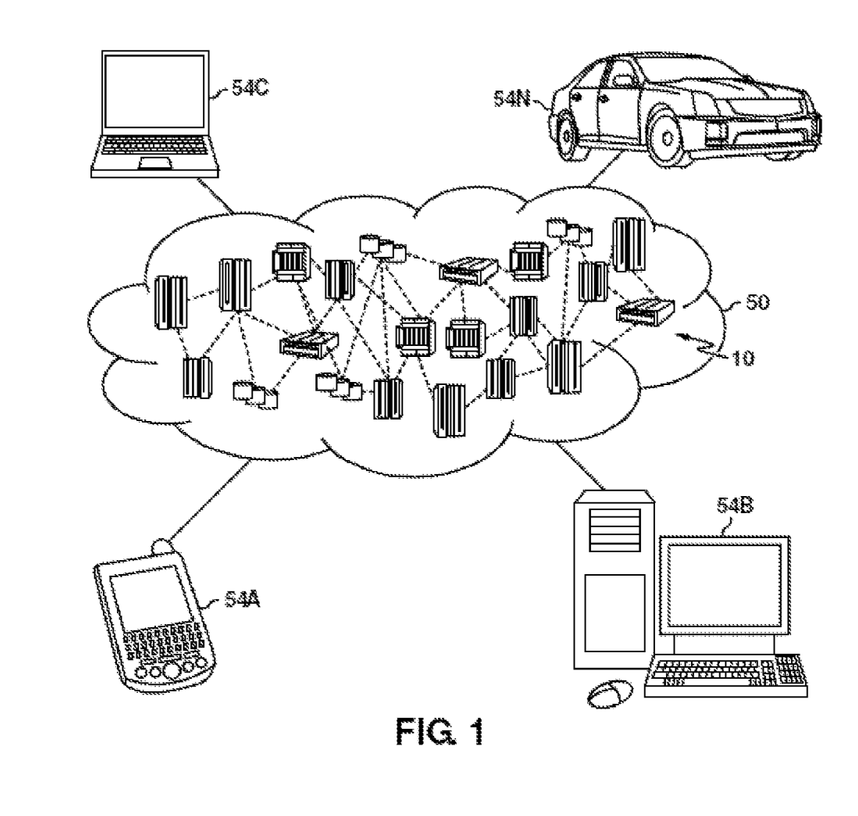
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
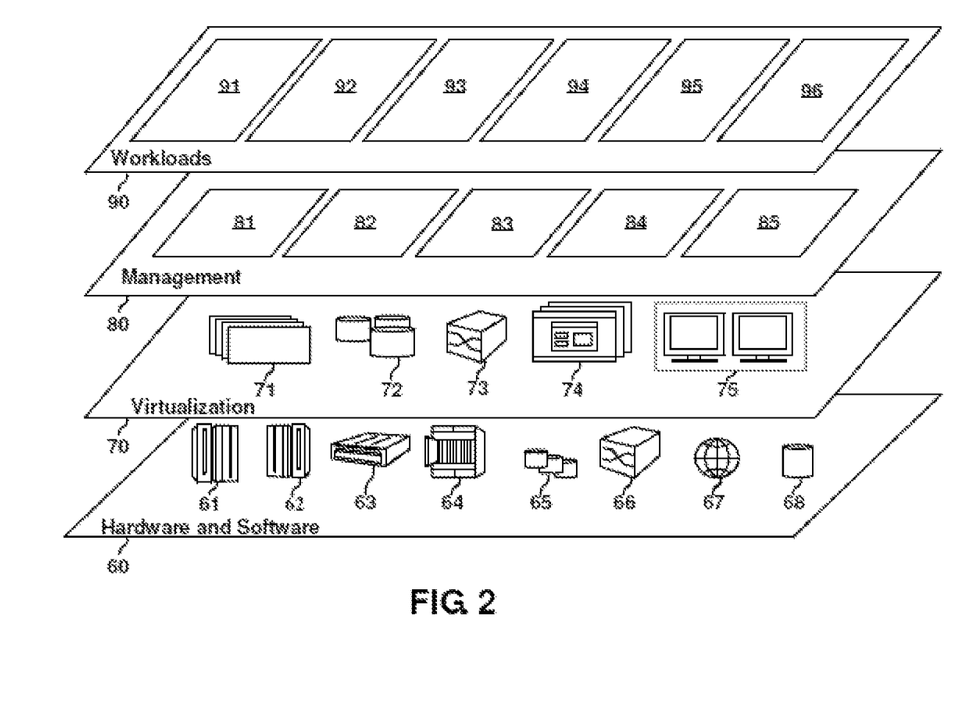
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a drone elastic map 96.

Figure 3:
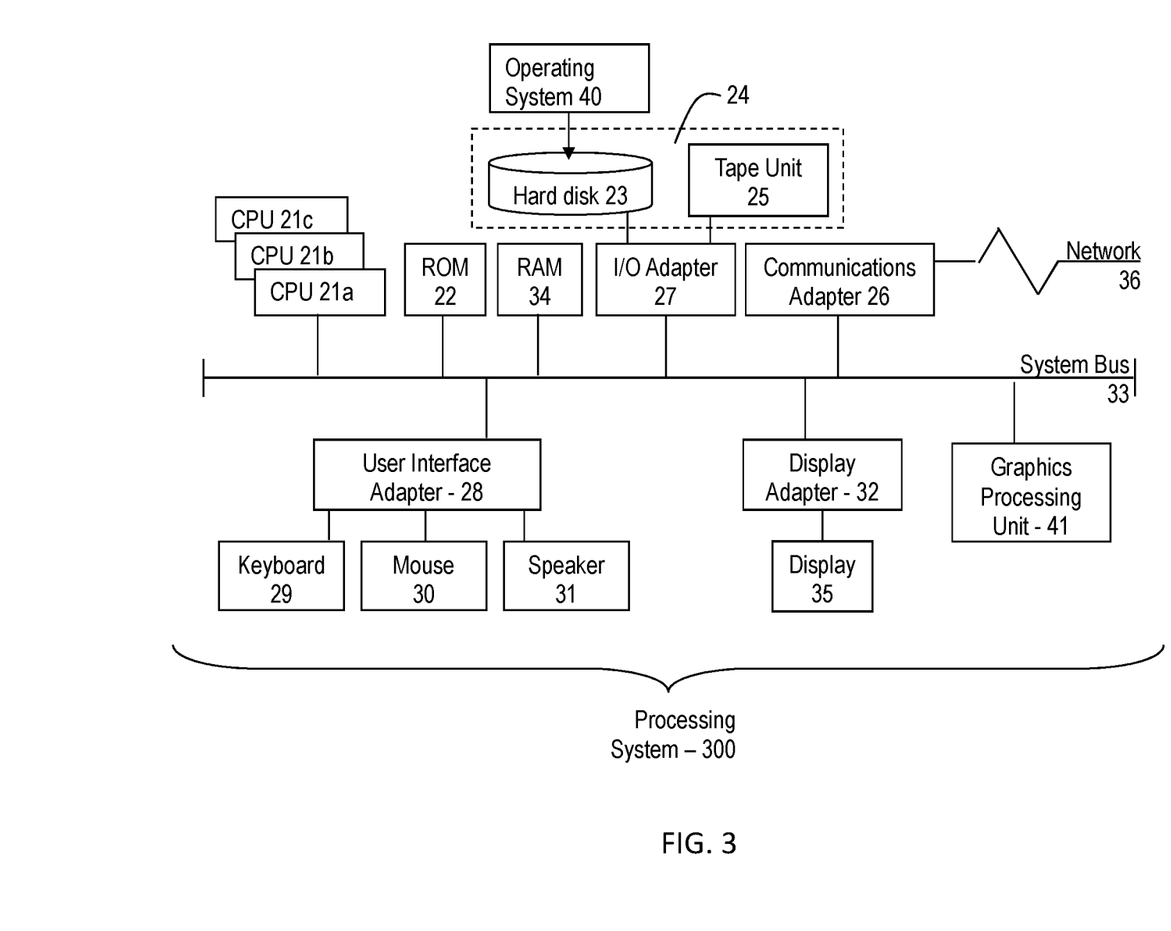
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, basic properties of electronic information include the multidimensionality of data objects. Typical data objects include hundreds and thousands of features that can be difficult to visualize in a 2 or 3 dimensional space (e.g., graphs and diagrams). Computing systems can utilize elastic maps to generate a visual representation of data objects using a two-dimensional (or three-dimensional) picture of the information and laying on it additional relevant information. Computing systems use elastic maps to represent data and clusters in a measurement space by embedding measurements in a curved manifold. The elastic connection between the nodes is utilized for creating an energy function that is minimized by simulating a physical system as the elastic connection attempts to maintain a tight relationship to representing the data space.

Elastic maps provide a computer-implemented tool for non-linear dimensionality reduction. By their construction, elastic maps are a system of elastic springs embedded in a data space. This system of elastic springs approximates a low-dimensional manifold. Elastic maps can be utilized for exploratory data analysis and visualization of multidimensional data and for data visualization.

Aspects of the present invention include utilizing unmanned aerial vehicles or "drones" to simulate an elastic map such that the data visualization of the elastic map clustering is implemented in situ by drone visual indicators or the drones themselves. To achieve this, an elastic map is utilized to simulate an elastic network of connections between drones, and to simulate an elastic connection between the drones and a physical environment being sampled for data.

Figure 4:
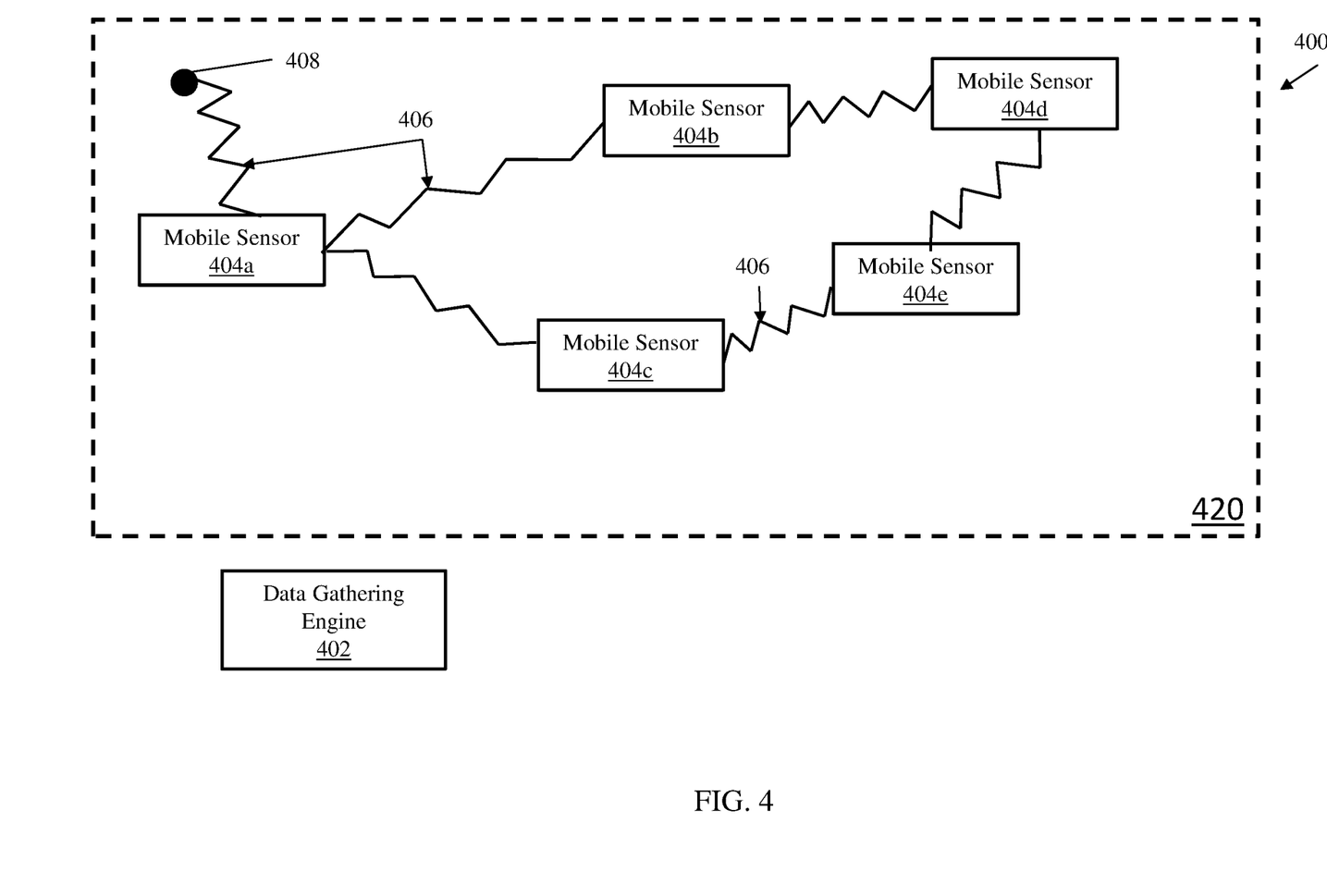
FIG. 4 depicts system for operating a set of mobile sensors according to embodiments of the invention.

In one or more embodiments of the invention, a computing system uses an elastic map to define an elastic net as a connected unordered graph that includes a set of graph nodes and a set of edges between some or all of these graph nodes. The edges are defined between adjacent nodes and adjacent edges and can be combined to define graph ribs. An overall energy function is defined which summarizes the energies of every node, edge, and rib in the graph. The graph can be simulated in a data space with the data space including multiple data point positions. These data points can be divided into sub-collections for a closest node in the graph. These data points can have associated weights based on the data for the data point. The energy of the nodes and edges can be defined as an elastic coupling between nodes through the edges. In a sense, the edges can be visualized as springs with unit elasticity which connect the nodes through the edges to other nodes and to data points in the data space. As more and more data points are collected, the nodes are adjusting their position within the data space according to the elasticity of the edges. As the overall energy function is minimized, the nodes will converge on a relaxed position within the data space where the clustering of the nodes will allow a user to visualize certain qualities of the data in the data space. In one or more embodiments of the invention, the nodes can be substituted with mobile sensors that can be deployed in a physical environment (data space). The mobile sensors can mimic the nodes of an elastic map and collect data in the physical environment. Based on the collected data, elastic coupling between a mobile sensor and the location of the collected data can be defined and simulated which will affect the mobile sensors movement in the physical environment. Depending on the value of the data collected, the mobile sensor may have a stronger coupling to the location of the collected data and because the mobile sensor is also coupled to other mobile sensors (other nodes) this will affect the position of these other mobile sensors. For example, if a set of mobile sensors are a set of aerial drones, an elastic map can be defined and the set of aerial drones can be deployed to a physical environment with their flight plans being determined based on the initial elastic coupling defined in the elastic map. As each of the aerial drones collects data, such as a concentration of particulates in the air, the aerial drones can cluster around physical locations that have a high concentration of particulates. As an energy function is minimized, the aerial drones will eventually relax and will cluster around areas of high concentrations of particulates in the air in a physical environment, for example. To enhance the visualization of these aerial drones (e.g., mobile sensors 404a-404e), a visual indicator can be included with each aerial drone to draw attention to the clustering of the aerial drones in the physical environment. The visual indicator can be, for example, a light-emitting diode (LED) or other light source. In one or more embodiments of the invention, the mobile sensors 404a-404e can have multiple visual indicators. The multiple visual indicator can be lights with different colors such as one red light and one green light. The visual indicators can be utilized to provide visual information to an observer. For example, at an airport, wind speed, wind shear, microbursts, and the like can be indicated by a red light to show to landing pilots that it is not optimal to fly through the area with the aerial drones. Also, the visual indicators can use a color coded scheme to deliver information about the wind speed, etc. such as a green light means safe whereas a yellow or orange light indicates caution to the landing pilots.

Turning now to a more detailed description of aspects of the present invention, FIG. 4 depicts system for operating a set of mobile sensors according to embodiments of the invention. The system 400 includes a data gathering engine 402 and a set of mobile sensors 404a-404e. As described above, the data gathering engine 402 can define an elastic map for a physical environment 420. The elastic map can include a set of nodes and configurable parameters that define an energy function for the edges between nodes. This energy function defines an elastic coupling between the nodes. In one or more embodiments of the invention, the elastic coupling can be defined utilizing Hook's law for springs. In one or more embodiments of the invention, the data gathering engine 402 can map the set of nodes to physical locations in the physical environment 420 and deploy the mobile sensors 404a-404e to these physical locations and simulate the elastic coupling between each mobile sensor 404a-404e. As the mobile sensors 404a-404e collect data points in the physical environment 420, the mobile sensors 404a-404e can be elastically coupled to the physical location of these data points. As shown in FIG. 4, a data point 408 is determined by mobile sensor 404a and based on the value of the data point 408, an elastic coupling 406 is simulated by the data gathering engine 402 based on the elastic map. Depending on the goal of this simulation, the value of the data collection can cause the elastic coupling to be strong or weak. For example, if the mobile sensors 404a-404e are utilized for data visualization for wind speed in a physical environment, the data points can be wind speed readings. For high wind speed data points, the physical location of where the mobile sensors 404a-404e collected the high wind speed data points can have a simulated, strong elastic coupling to the mobile sensor that detected the high wind speed. As the energy function of the elastic map is minimized, the mobile sensors 404a-404e will cluster around physical locations having high wind speed. This visualization of high wind speed by the mobile sensors 404a-404e can be utilized for pilots landing and/or taking off in the physical environment of an airport. The pilot can see the clustering of drones or the visual indicators to determine that a certain area has high wind speed and may be dangerous to fly though. In addition to wind speed, in some embodiments, the environmental data taken regarding the airport conditions can be wind shear, microbursts, thermal temperatures, and any other environmental data that can affect air plane landings. The clustering of drones near the approach of runways could be used to indicate any and all of these conditions which can cause planes to crash, particularly in the vicinity of convective (storm) activity. Typically ground based sensors are used, as well as reports from the pilots of landing planes. Real-time sensors, and visual indicators provided by the clustering of the mobile sensors 404a-404e and/or the visual lights can replace these ground based sensors. Iteratively collecting environmental data points by each mobile sensor in the set of mobile sensors 404a-404e at a corresponding physical location is also possible, in which determining an environmental data point coupling for a new edge between each mobile sensor and the corresponding physical location is necessary. Thus, resampling the environment at a different point during from the initial configuration is also possible. This can be done iteratively or continuously. It is also possible that this resampling be triggered by some irregular criterion or some event. For example, the triggering may be caused by a second modality of sensing, a user input, a criterion determined by coupling tensions, etc. Furthermore, the resampling may be caused be coupled with a random perturbation. In this way, the system may avoid local minima and converge to a better, more robust visualization of the data distribution.

In one or more embodiments of the invention, the mobile sensors 404a-404e can be aerial drones, land drones, or underwater drones that are configured to determine certain properties of their physical environment and cluster around areas that are of interest based on the properties of these areas. In one or more embodiments of the invention, the data gathering engine 402 can transmit this data from the mobile sensors 404a-404e and further visualize the data by overlaying the clustering of the mobile sensors 404a-404e on a map for viewing on a computer, tablet, or smart phone. In one or more embodiments of the invention, properties of a physical environment that can be determined by these mobile sensors 404a-404e can include, but are not limited to, humidity, temperature, pollen count, and concentrations of biological matter, carbon monoxide, nitrogen dioxide, ozone, particulate matter, sulphur dioxide, and hydrogen sulfide. These properties can be measured through continuous (real-time) or non-continuous (discrete) monitoring in a database.

In one or more embodiments of the invention, the mobile sensors 404a-404e can be deployed responsive to an event occurring in a given environment such as a forecast of possible problems, an estimation of cohorts at risk in an area (e.g., individuals susceptible to certain conditions), historical issues, and the like. For example, when there is a forecast of excessive heat for a day in a large city, the mobile sensors can be deployed automatically and cluster around pockets or areas of the city with areas of excessive heat so that certain individuals susceptible to heat can avoid by observing the visual indicators of the mobile sensors.

In one or more embodiments of the invention, the mobile sensors 404a-404e can be deployed as underwater drones. With respect to these underwater drones, they may measure one or more water characteristics including, but not limited to, water current velocity, temperature, microorganisms, protozoa and bacteria, inorganic contaminants, organic chemical contaminants from industrial processes and petroleum use, pesticides and herbicides, and any other contaminants. Water quality can depend on the local geology and ecosystem as well as human uses such as sewage dispersion, industrial pollution, use of water bodies as a heat sink, and overuse. Similarly, the underwater drones can monitor one or more of alkalinity, color of water, pH, dissolved metals and salts, microorganisms, dissolved metals and metalloid, dissolved organics, radon, heavy metals, pharmaceuticals, surfactants, and local water currents, tide heights, and salinity. As mentioned above, the underwater drones can be deployed based on certain forecasted conditions such as an increase in water current at beaches to indicate to swimmers that they should avoid certain areas that can have dangerous water currents or "rip currents." In one or more embodiments of the invention, the mobile sensors 404a-404e can have one or more visual indicators as mentioned above which can indicate certain information about the characteristics of the water such as, for example, caution, safe, etc.

In one or more embodiments of the invention, the data gathering engine 402 can be housed remote from the mobile sensors 404a-404e or, in some embodiments, the data gathering engine 402 can be housed within at least one of the mobile sensors 404a-404e. In one or more embodiments of the invention, the data gathering engine 402 and the circuity of the mobile sensors 404a-404e can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

Figure 5:
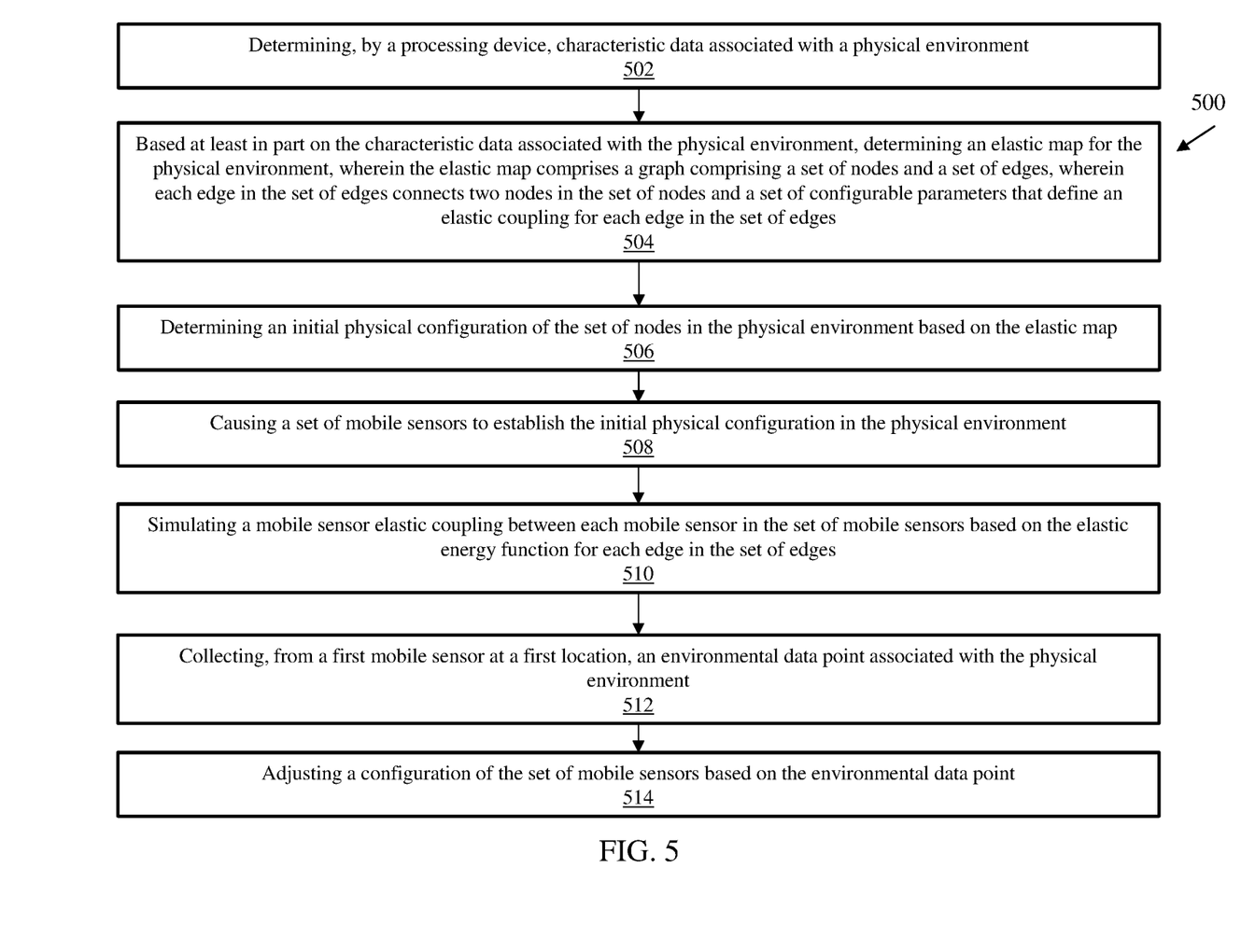
FIG. 5 depicts a flow diagram of a method for operating a set of mobile sensors according to one or more embodiments of the invention.

FIG. 5 depicts a flow diagram of a method for operating a set of mobile sensors according to one or more embodiments of the invention. The method 500 can be performed by the system 400 and includes determining, by a processing device, characteristic data associated with a physical environment, as shown in block 502. At block 504, the method 500 includes based at least in part on the characteristic data associated with the physical environment, determining an elastic map for the physical environment, wherein the elastic map comprises a graph comprising a set of nodes and a set of edges, wherein each edge in the set of edges connects two nodes in the set of nodes and a set of configurable parameters that define an elastic coupling for each edge in the set of edges. The method 500, at block 506, includes determining an initial physical configuration of the set of nodes in the physical environment based on the elastic map. Also, at block 508, the method 500 includes causing a set of mobile sensors to establish the initial physical configuration in the physical environment. The method 500 also includes simulating a mobile sensor elastic coupling between each mobile sensor in the set of mobile sensors based on the elastic energy function for each edge in the set of edges, as shown at block 510. The method 500, at block 512, includes collecting, from a first mobile sensor at a first location, an environmental data point associated with the physical environment. And at block 514, the method 500 includes adjusting a configuration of the set of mobile sensors based on the environmental data point.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a processing device, characteristic data associated with a physical environment;
   based at least in part on the characteristic data associated with the physical environment, determining an elastic map for the physical environment, wherein the elastic map comprises:
      a graph comprising a set of nodes and a set of edges, wherein each edge in the set of edges connects two nodes in the set of nodes; and
      a set of configurable parameters that define an elastic coupling for each edge in the set of edges;
   determining an initial physical configuration of the set of nodes in the physical environment based on the elastic map;
   causing a set of mobile sensors to establish the initial physical configuration in the physical environment;
   simulating a mobile sensor elastic coupling between each mobile sensor in the set of mobile sensors based on a elastic energy function for each edge in the set of edges;
   collecting, from a first mobile sensor in the set of mobile sensors at a first location, an environmental data point associated with the physical environment; and
   adjusting the initial physical configuration of the set of mobile sensors based on the environmental data point to form a second configuration of the set of mobile sensors.

2. The computer-implemented method of claim 1, wherein the adjusting the initial physical configuration of the set of mobile sensors comprises causing an adjustment in a position of a second mobile sensor in the set of mobile sensors based on the environmental data point.

3. The computer-implemented method of claim 1, wherein adjusting the initial physical configuration of the set of mobile sensors comprises:
   determining a data point elastic coupling between the first mobile sensor in the set of mobile sensors and the first location, wherein the data point elastic coupling comprises an energy function representing a data point edge between the first location and the first mobile sensor in the set of mobile sensors;
   adjusting at least one configurable parameter in the set of configurable parameters to redefine the data point elastic coupling between the first mobile sensor in the set of mobile sensors and at least one other mobile sensor in the set of mobile sensors; and
   causing the at least one other mobile sensor in the set of mobile sensors to move from a first position to a second position based on the data point elastic coupling.

4. The computer-implemented method of claim 1 further comprising:
   collecting, by a second mobile sensor at a second physical location, a second environmental data point associated with an area; and
   adjusting the second configuration of the set of mobile sensors based at least in part on the second environmental data point.

5. The computer-implemented method of claim 1, wherein the elastic map further comprises an energy function for the set of configurable parameters that define the elastic coupling for each edge in the set of edges; and further comprising:
   iteratively collecting environmental data points by each mobile sensor in the set of mobile sensors at a corresponding physical location; and
   determining an environmental data point coupling for a new edge between each mobile sensor and the corresponding physical location.

6. The computer-implemented method of claim 5 further comprising:
   responsive to collecting a threshold number of environmental data points, minimizing the energy function for the set of configurable parameters to determine a third configuration for the set of mobile sensors in the physical environment; and
   causing the set of mobile sensors to establish the third configuration in the physical environment.

7. The computer-implemented method of claim 1, wherein each mobile sensor in the set of mobile sensors includes a visual indicator.

8. The computer-implemented method of claim 7, wherein the visual indicator comprises a light.

9. The computer-implemented method of claim 7, wherein the visual indicator is operated based on the environmental data point.

10. The computer-implemented method of claim 1, wherein the processing device is housed within at least one mobile sensor in the set of mobile sensors.

11. The computer-implemented method of claim 1, wherein the processing device is separate from the set of mobile sensors.

12. The computer-implemented method of claim 1, wherein the first mobile sensor in the set of mobile sensors comprises a drone.

13. A system comprising:
   a set of mobile sensors; and
   a processing device communicatively coupled to the set of mobile sensors, the processing device configured to:
      determine characteristic data associated with a physical environment;
      based at least in part on the characteristic data associated with the physical environment, determine an elastic map for the physical environment, wherein the elastic map comprises:
         a graph comprising a set of nodes and a set of edges, wherein each edge in the set of edges connects two nodes in the set of nodes; and
         a set of configurable parameters that define an elastic coupling for each edge in the set of edges;

determine an initial physical configuration of the set of nodes in the physical environment based on the elastic map;

cause a set of mobile sensors to establish the initial physical configuration in the physical environment;

simulate a mobile sensor elastic coupling between each mobile sensor in the set of mobile sensors based on a elastic energy function for each edge in the set of edges;

collect, from a first mobile sensor in the set of mobile sensors at a first location, an environmental data point associated with the physical environment; and adjust the initial physical configuration of the set of mobile sensors based on the environmental data point to form a second configuration of the set of mobile sensors.

14. The system of claim 13, wherein the adjusting the initial physical configuration of the set of mobile sensors comprises causing an adjustment in a position of a second mobile sensor in the set of mobile sensors based on the environmental data point.

15. The system of claim 13, wherein adjusting the initial physical configuration of the set of mobile sensors comprises:

determining a data point elastic coupling between the first mobile sensor in the set of mobile sensors and the first location, wherein the data point elastic coupling comprises an energy function representing a data point edge between the first location and the first mobile sensor in the set of mobile sensors;

adjusting at least one configurable parameter in the set of configurable parameters to redefine the data point elastic coupling between the first mobile sensor in the set of mobile sensors and at least one other mobile sensor in the set of mobile sensors; and causing the at least one other mobile sensor to move from a first position to a second position based on the data point elastic coupling.

16. The system of claim 13, wherein the processing device is further configured to:

collect, from a second mobile sensor, a second environmental data point associated with the area; and adjust a second position of the second mobile sensor in the set of mobile sensors based at least in part on the second environmental data point.

17. A computer program product comprising a computer readable storage medium having program instructions embodied therewith, wherein the computer readable storage medium is not a transitory signal per set, the program instructions executable by a processing device to cause the processing device to perform a method comprising:

determining, by the processing device, characteristic data associated with a physical environment;

based at least in part on the characteristic data associated with the physical environment, determining an elastic map for the physical environment, wherein the elastic map comprises:

a graph comprising a set of nodes and a set of edges, wherein each edge in the set of edges connects two nodes in the set of nodes; and a set of configurable parameters that define an elastic coupling for each edge in the set of edges;

determining an initial physical configuration of the set of nodes in the physical environment based on the elastic map;

causing a set of mobile sensors to establish the initial physical configuration in the physical environment;

simulating a mobile sensor elastic coupling between each mobile sensor in the set of mobile sensors based on a elastic energy function for each edge in the set of edges;

collecting, from a first mobile sensor in the set of mobile sensors at a first location, an environmental data point associated with the physical environment; and adjusting the initial physical configuration of the set of mobile sensors based on the environmental data point to form a second configuration of the set of mobile sensors.

18. The computer program product of claim 17, wherein the adjusting the initial physical configuration of the set of mobile sensors comprises causing an adjustment in a position of a second mobile sensor in the set of mobile sensors based on the environmental data point.

19. The computer program product of claim 17, wherein adjusting the initial physical configuration of the set of mobile sensors comprises:

determining a data point elastic coupling between the first mobile sensor in the set of mobile sensors and the first location, wherein the data point elastic coupling comprises an energy function representing a data point edge between the first location and the first mobile sensor in the set of mobile sensors;

adjusting at least one configurable parameter in the set of configurable parameters to redefine the data point elastic coupling between the first mobile sensor in the set of mobile sensors and at least one other mobile sensor in the set of mobile sensors; and causing the at least one other mobile sensor in the set of mobile sensors to move from a first position to a second position based on the data point elastic coupling.

20. The computer program product of claim 17, further comprising:

collecting, by a second mobile sensor, a second environmental data point associated with the area; and adjusting a second position of the second mobile sensor in the set of mobile sensors based at least in part on the second environmental data point.

* * * * *